US011891876B2

United States Patent
Sepulveda et al.

(10) Patent No.: US 11,891,876 B2
(45) Date of Patent: Feb. 6, 2024

(54) METHODS AND SYSTEMS FOR ROTATING A CASING TO ENSURE EFFICIENT DISPLACEMENT OF CEMENT SLURRY

(71) Applicant: Ranton Holding LLC, Houston, TX (US)

(72) Inventors: Michael Sepulveda, Houston, TX (US); Sigurd Eirik Sperbund, Houston, TX (US)

(73) Assignee: NESA ENERGY LLC, Austin, TX (US)

(*) Notice: Subject to any disclaimer, the term of this patent is extended or adjusted under 35 U.S.C. 154(b) by 0 days.

(21) Appl. No.: 18/105,555

(22) Filed: Feb. 3, 2023

(65) Prior Publication Data

US 2023/0175349 A1  Jun. 8, 2023

Related U.S. Application Data

(63) Continuation of application No. 17/355,456, filed on Jun. 23, 2021, now Pat. No. 11,598,176.

(60) Provisional application No. 63/137,515, filed on Jan. 14, 2021.

(51) Int. Cl.
*E21B 33/14* (2006.01)
*F16D 23/14* (2006.01)

(52) U.S. Cl.
CPC ............. *E21B 33/14* (2013.01); *F16D 23/14* (2013.01)

(58) Field of Classification Search
CPC ..................................................... E21B 33/14
See application file for complete search history.

(56) References Cited

U.S. PATENT DOCUMENTS

| | | | | |
|---|---|---|---|---|
| 5,038,862 A | * | 8/1991 | Giroux | E21B 33/146 166/318 |
| 2014/0083689 A1 | * | 3/2014 | Streich | E21B 34/102 166/250.15 |

* cited by examiner

*Primary Examiner* — William D Hutton, Jr.
*Assistant Examiner* — Avi T Skaist
(74) *Attorney, Agent, or Firm* — Pierson IP, PLLC

(57) ABSTRACT

Rotating a casing during a cementing operation to ensure efficient displacement of cement slurry. More specifically, embodiments are directed towards a sub and rotating tool that are positioned above a first cement operation, wherein the rotating tool is positioned in a kickoff point or build section of a horizontal well.

18 Claims, 13 Drawing Sheets

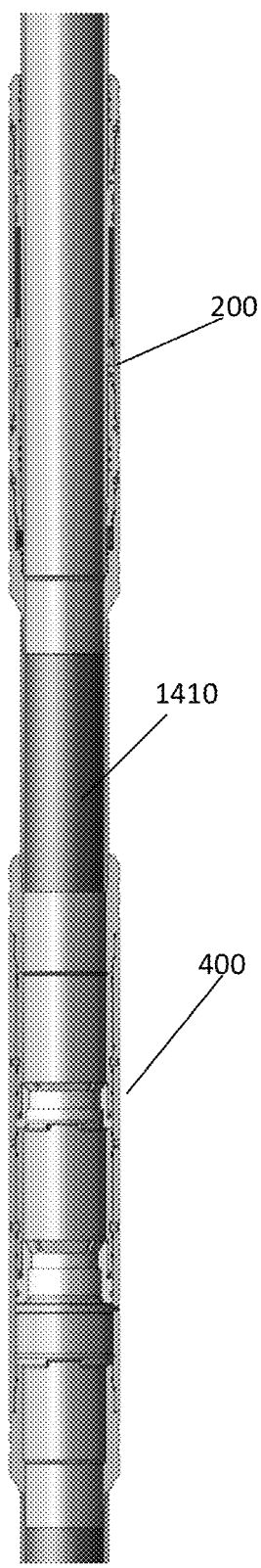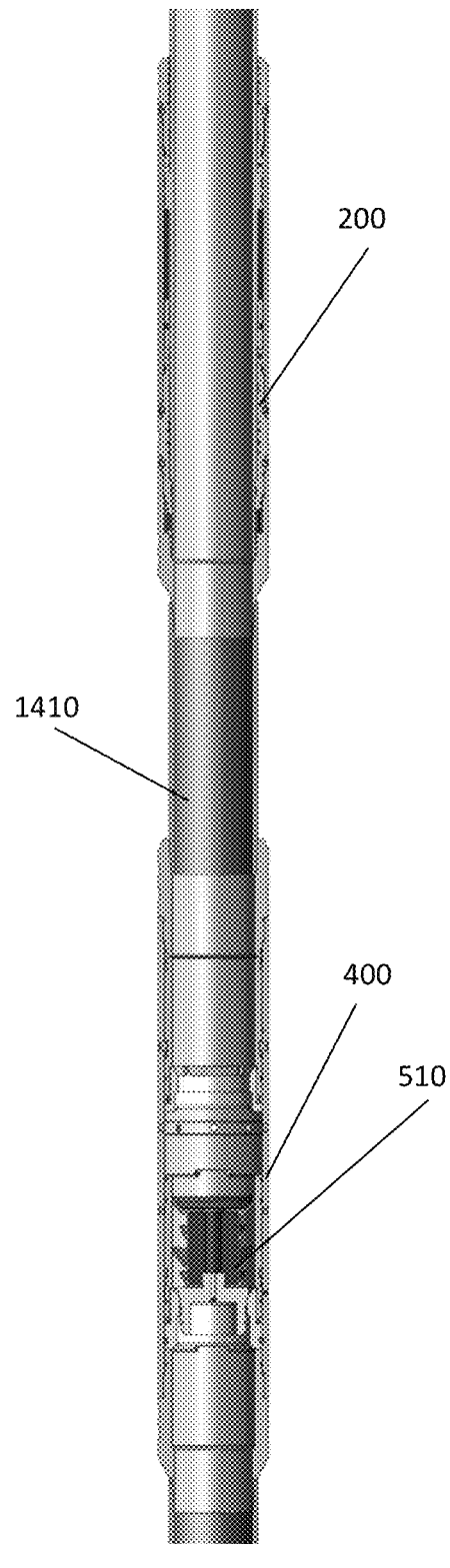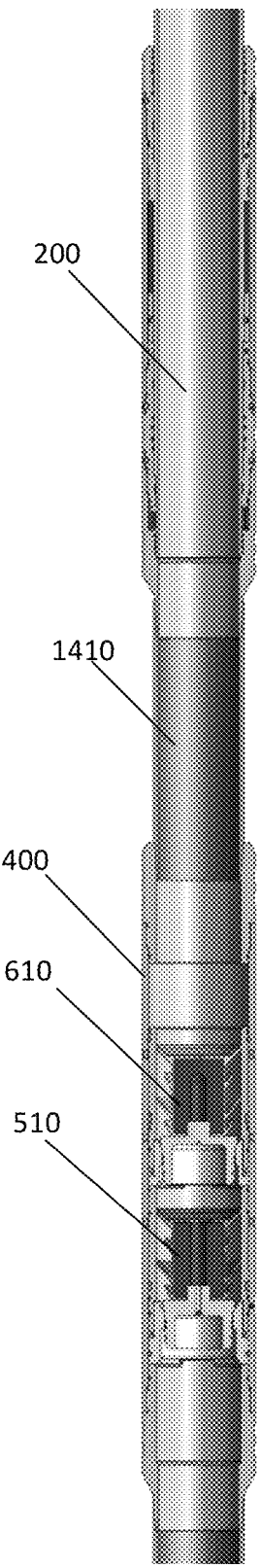
FIGURE 14
FIGURE 15
FIGURE 16

METHODS AND SYSTEMS FOR ROTATING A CASING TO ENSURE EFFICIENT DISPLACEMENT OF CEMENT SLURRY

BACKGROUND INFORMATION

Field of the Disclosure

Examples of the present disclosure relate to systems and methods rotating a portion of the casing during a cementing operation to ensure efficient displacement of cement slurry. More specifically, embodiments are directed towards a sub and rotating tool that are positioned above a first cement operation, wherein the rotating tool is positioned in a kickoff point or build section of a well, such as a vertical, horizontal, or deviated well.

Background

Directional drilling is the practice of drilling non-vertical wells. Deviated wells tend to be more productive than vertical wells because they allow a single well to reach multiple points of the producing formation across a horizontal axis without the need for additional vertical wells. This makes each individual well more productive by being able to reach reservoirs across the horizontal axis. While horizontal wells are more productive than conventional wells, horizontal wells are costlier.

Conventionally, casing is run in hole, and cement is pumped through the inner diameter of the casing. Subsequently, the cement is displaced through the inner diameter of the casing string and separated from spacer and drilling fluid via wipers and other systems. Float collars are conventionally run in at the toe of a horizontal section of a well to establish circulation and to prevent back-flow entering the inside of the casing string.

However, due to a length and weight of a string and wellbore geometry it is often impossible to rotate an entire casing, liner, string during circulation. A second stage cement job will be performed due to restriction of the pore pressure and fracture gradient of the formation. In order to prevent formation break down, the casing string is cemented in two stages, hydraulically isolating the first and second stage.

Accordingly, needs exist for systems and methods for a sub and rotating tool that are positioned above a first cement operation, wherein the rotating tool is positioned in a kickoff point or build section of a deviated well.

SUMMARY

Examples of the present disclosure relate to systems and methods for a rotating tool that is positioned above a first cementing operation, wherein the rotating tool is positioned in a kickoff point or build section of a horizontal well. Specifically, the rotating tool may be positioned at a location where it is estimated where the formation will (breakdown) crack due to hydrostatic pressure within an annulus between the rotating tool and the formation. The rotating tool may include an inner housing and an outer housing, wherein the outer housing is coupled to a casing string. The inner housing may be configured to receive forces to rotate the outer housing. Responsive to the inner housing rotating in a first direction, the inner housing may freely rotated with transferring these forces to the outer housing due to a clutch positioned between the inner and outer housing. As such, the clutch may enable the inner housing to freely rotate above the clutch when rotating in a first direction, and the clutch transfer rotation forces to the casing string below the rotating tool, via the outer housing, to rotate when rotated in a second direction.

In embodiments, a first stage cement job may be executed as a normal standard cement job of any casing string, wherein the first stage cement job may be pumped through the rotating tool. A burst disc associated with the first stage cement job may burst at between 200-350 psi. The casing may be circulated at least for one string volume to clean the string and to condition the wellbore. A spacer may then be pumped downhole, and additional wiper plug or any other object (referred to hereinafter collectively and individually as "wiper plug") that may activate downhole tools may be pumped downhole to physically separate the spacer from the cement, and to separate the cement from the displacement fluid, and to clean the inner diameter of the tool. In embodiments, once the top plug has landed on the collar at the bottom of the first stage cement job, the string in the wellhead may be hanged, the entire string may be pressured to radially expand a packer, and the integrity of the string may be verified. The integrity of the first stage cement job may be set at approximately 1200 psi.

Then, a second stage cementing job may be completed above the rotating tool with a sub or housing tool. The sub may include a burst disc or any other removable object (referred to hereinafter collectively and individually as "burst disc") positioned within a burst disc port, communication ports, lower sleeve, and an upper sleeve. In embodiments, a packer positioned below the rotating tool may expand across the annulus at a psi of approximately 2500 psi, and pressure may be configured to build within the housing to burst the burst disc. When the burst disc ruptures a burst disc port may be exposed, wherein the burst disc may burst at approximately 3000-3500 psi. This may establish circulation within the inner diameter of the housing and the annulus. Then, a first wiper plug may be launched, land on the lower sleeve, move the lower sleeve at approximately 1000 psi. This movement of the lower sleeve may expose a communication port while closing and sealing off the burst disc port. Cement may then circulate or be displaced at 6-8 bbbls/min into the annulus while rotating the upper part of the string with 15-30 rpm to uniformly displace the cement into the annulus. This may ensure annular cement well barrier element integrity when creating a zonal isolation barrier. Next, a second wiper plug may be launched, land on the upper sleeve, move the upper sleeve at approximately 15000 psi, close the communication ports, and lock the upper sleeve in position.

Once the upper sleeve is locked in position, the rotating tool may stop rotating, the casing string may hang off, and the upper part of the casing string above the rotating tool may be pressure tested to verify integrity at approximately 4500 psi. The landing profile in the lower and upper sleeve will be drilled/milled away to ensure full inner diameter of the casing string, and thus not causing any restriction of the casing string.

In other embodiments, the plug system may be run in hole as part of the upper completions, which may be positioned just above a production packer. This may eliminate fluid at a stage of the well, which may reduce intervention complexity. For example, instead of running wireline tools, a plug system can be deployed from surface and pumped down to open the port collar, while sealing off the reservoir.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 14-16 depicts a rotating tool coupled to a sub via a casing string, according to an embodiment.

Figure 1:
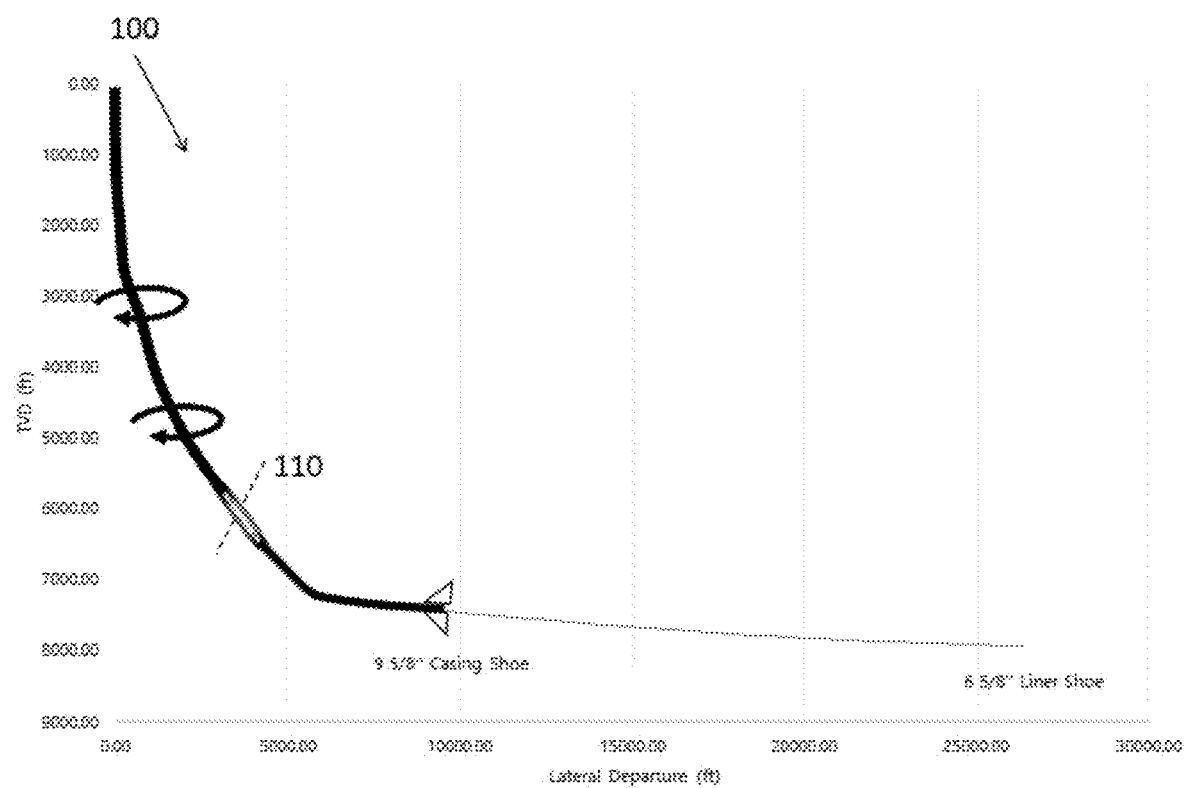
FIG. 1 depicts a relative placement of a rotating tool within a wellbore, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art, that the specific detail need not be employed to practice the present embodiments. In other instances, well-known materials or methods have not been described in detail in order to avoid obscuring the present embodiments.

Figure 2:
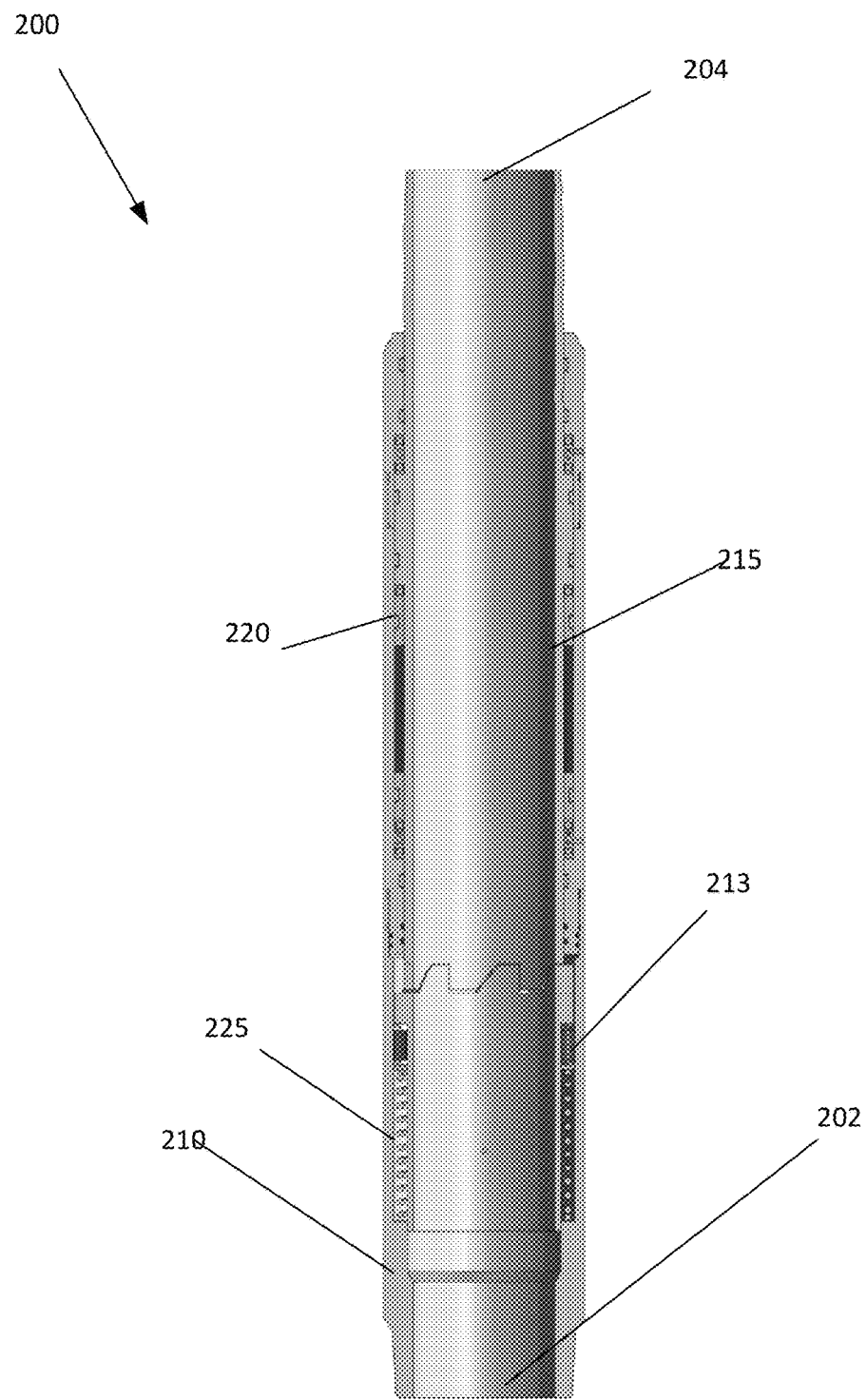
FIG. 2 depicts a rotating tool, according to an embodiment.

FIG. 1 depicts a relative placement of a rotating tool 110 within a wellbore 100, according to an embodiment. Rotating tool 110 may be positioned in a kickoff point or build section of wellbore 100. Specifically, rotating tool 110 may be positioned at a location where it is estimated where the formation will fracture due to hydrostatic pressure within an annulus between the rotating tool and the formation, and where the upper part above the rotating tool can be rotated without restrictions/limitations FIG. 2 depicts a rotating tool 200, according to an embodiment. In embodiments, rotating tool 200 may be configured to rotate in a first direction, such as a right hand turn, while being restricted in rotating in a second direction, such as a left hand turn. Rotating tool 200 may include a downhole end 202 and an up hole end 204, wherein downhole end 202 may be coupled to existing casing, which may be created during a first casing operation. Up hole end 204 may be coupled to up hole tools, such as a wiper collar that is configured to receive a first and second wiper. Responsive to rotating tool 200 rotating in a first direction, the up hole tools may correspondingly rotate while the downhole tools remain stationary, and rotating the rotating tool 200 in a second direction may cause the downhole tools to correspondingly rotate. In embodiments, rotating tool 200 may include an outer housing 210, inner housing 215, rotating element 220, and spring 225. The inner diameter of the tool is equal or larger than the inner diameter of the casing string in use.

Outer housing 210 may be configured to be positioned on an outer diameter of inner housing 215. Outer housing 210 may be configured to receive forces via clutch 213 when inner housing 215 is rotating in a second direction to rotate outer housing. However, when inner housing 215 rotates in a first direction, clutch 213 may not transfer these forces to outer housing 210. Rotating element 220 may be positioned within a chamber between inner housing 215 and outer housing 210. Rotating element 220 may be configured to rotate based on a clutch 213. Rotating element 220 for example may be bearings between inner housing 215 and outer housing 210 that include a wheel and a fixed axle, in which the rotating part and the stationary part are separated by a ring of small solid meal balls that reduce friction. Clutch 213 may be configured to allow the transmission of forces in a first rotational direction, while lock up when rotating in the second direction. Rotating element 220 may also include bearings that allow clutch 213 to engage and disengage based on the rotational direction of rotating element 220. Spring 225 may be configured to be positioned between an upper surface of rotating element 220 and a ledge on outer housing 210. Spring 225 may be configured to assist in receiving compressive forces against rotating tool 200 when rotating tool 200 is rotating.

Figure 3:
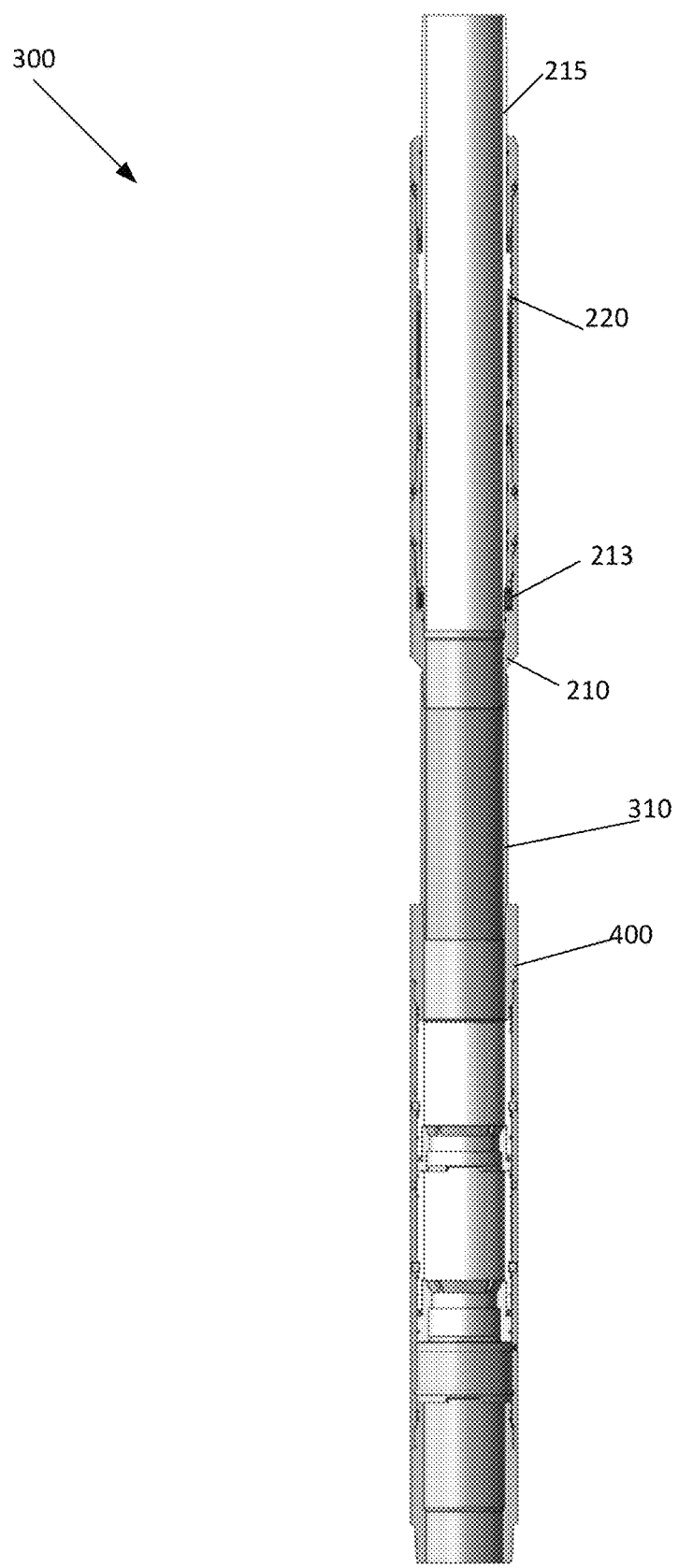
FIG. 3 depicts a rotating tool, according to an embodiment.

FIG. 3 depicts a rotating tool 300, according to an embodiment. Elements depicted in FIG. 3 may be described above, and for the sake of brevity a further descriptions of these elements may be omitted.

As depicted in FIG. 3, rotating element 220 may be positioned between an outer housing 210 and inner housing 215. In embodiments, rotating element 220 may be positioned within a chamber without springs 225.

Figure 4:
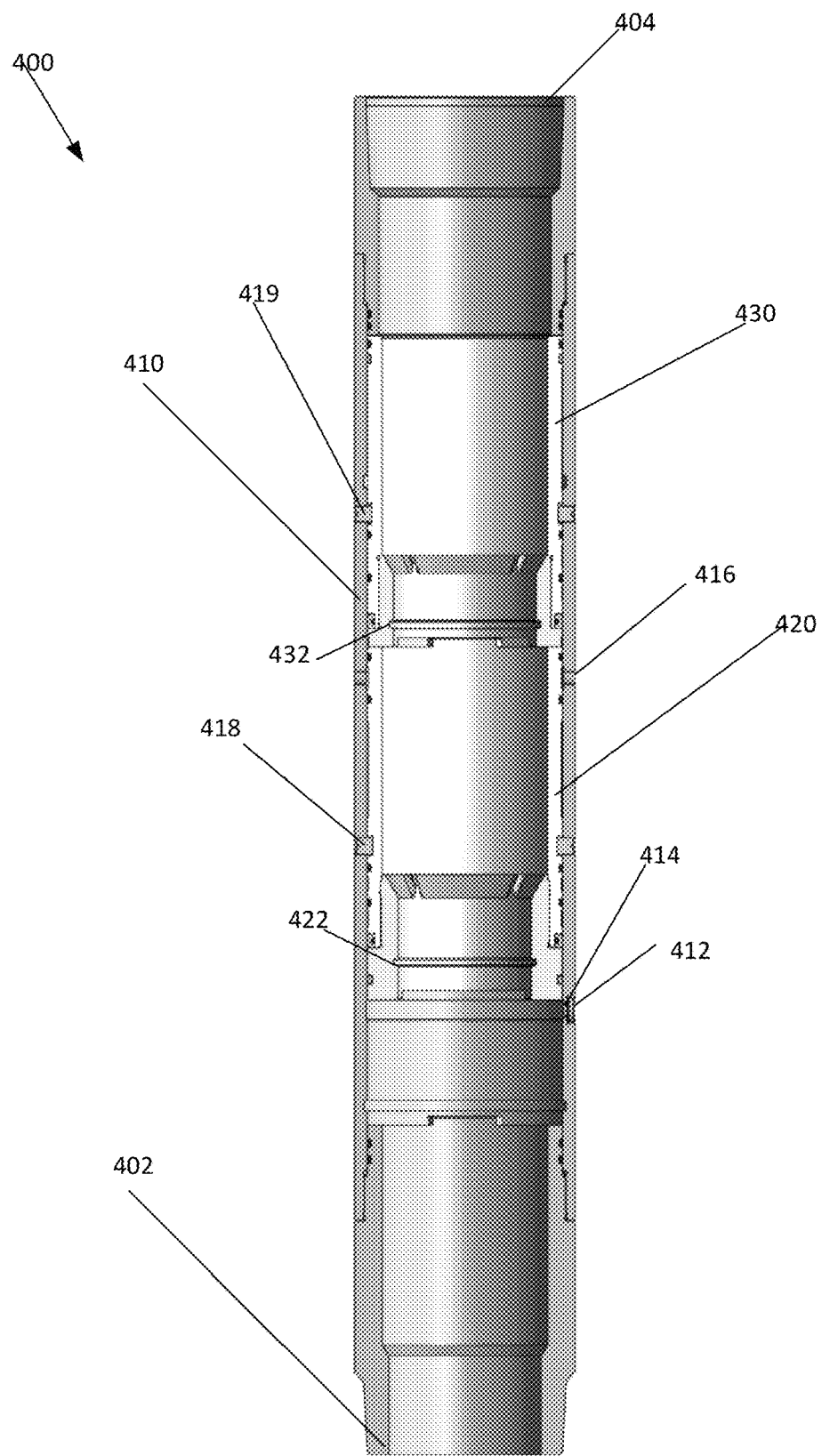
FIG. 4 depicts a sub, according to an embodiment.

FIG. 4 depicts a sub 400, according to an embodiment. Sub 400 may be configured to receive a first wiper plug and a second plug to complete a cementing operation. A distal end 402 of sub 400 may be mechanically coupled to proximal end 202 of rotating tool 200. Responsive to rotating tool 200 rotating, sub 400 may correspondingly rotate. This may enable sub 400 to rotate while emitting cement into an annulus between the outer diameter of sub 400 and an inner diameter of a geological formation.

Sub 400 may include a housing 410, first sleeve 420, and a second sleeve 430. Housing 410 may be a 9⅝" casing that is configured to receive mechanical forces from rotating tool 200 to rotate. Housing 410 may also be configured to house the elements of sub 400. Housing 410 may include a burst disc port 412, communication port 416, first shear pin 418, and second shear pin 419.

Burst disc port 412 may be configured to extend from an inner diameter of sub 400 to an annulus positioned outside of an outer diameter of sub 400. When run in hole, burst disc port 412 may not be covered by first sleeve 410. However, after first sleeve 410 slides downhole, first sleeve 410 may cover burst disc port 412. Burst disc port 412 may be configured to house a burst disc 414 when burst disc 414 is intact. Burst disc 414 may be a disc that is configured to break after a first stage cement job, wherein burst disc 414 ruptured based upon a pressure applied against burst disc 414 or a pressure differential across burst disc 414 being greater than a pressure threshold. For example, the pressure threshold to rupture burst disc 414 may be between 3000-3500 psi, which may be substantially greater than a burst disc associated with a sub positioned below rotating tool 200. When burst disc 414 is intact, burst disc 414 may be configured to block communication across burst disc port 412. However, when burst disc 414 is broken and burst disc port 412 is not covered, then the annulus outside of sub 400 and the inner diameter of sub 400 may be in communication. In embodiments, after the burst disc 414 bursts, circulation may be established between the inner diameter and annulus of sub 400, and then a first wiper plug may be launched.

Communication port 416 may be a port extending from the inner diameter of sub 400 to the annulus positioned outside of an outer diameter of sub 400. In embodiments, communication port 416 may be positioned between burst disc port 412 and proximal end 404, and may also be positioned between first shear pin 418 and second shear pin 419. Communication port 416 may be covered by first sleeve 420 when sub 400 is run in hole, uncovered when first sleeve 420 slides towards distal end 402 and second sleeve 430 is coupled to housing 410 via second shear pin 419, and covered when second sleeve 430 slides towards distal end 402.

First shear pin 418 may be configured to selectively couple first sleeve 420 with housing 410. First shear pin 418 may be configured to shear responsive to a pressure being applied to first shear pin 418 being greater than a first threshold. Responsive to first shear pin 418 shearing, first sleeve 4120 may be configured to slide towards distal end 402. In embodiments, first shear pin 418 may be configured to shear responsive to a wiper plug landing on first sleeve 420, causing a pressure above first sleeve 420 to increase past the first threshold.

Second shear pin 419 may be configured to selectively couple second sleeve 430 with housing 410. Second shear pin 419 may be configured to shear responsive to pressure being applied to second shear pin 419 being greater than a second threshold. Responsive to second shear pin 419 shearing, second sleeve 430 may be configured to slide towards distal end 402. In embodiments, second shear pin 419 may be configured to shear responsive to a wiper plug landing on second sleeve 430, causing a pressure above second sleeve 430 to increase past the second threshold.

Figure 5:
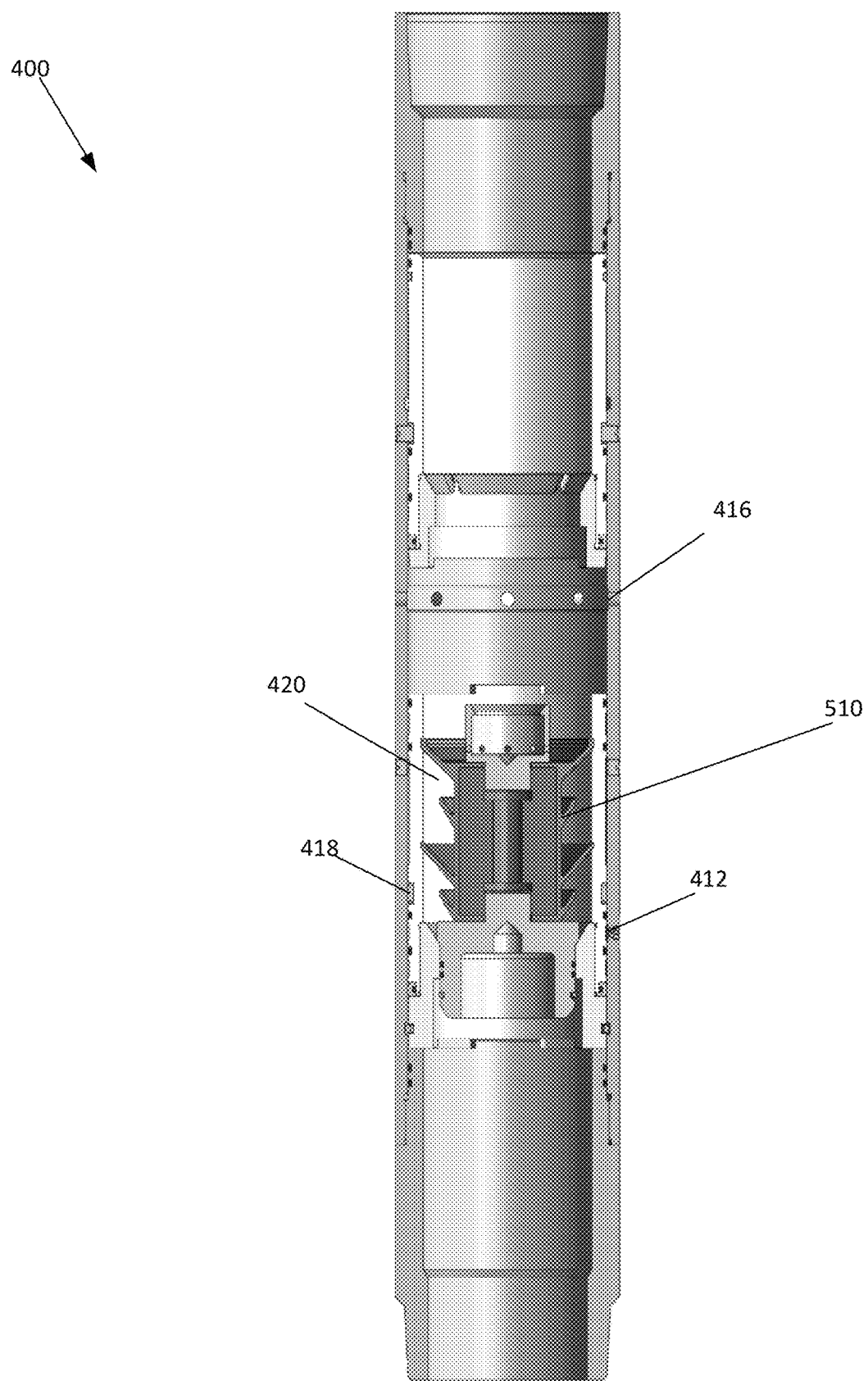
FIG. 5 depicts a sub positioned above a rotating tool, according to an embodiment.

FIG. 5 depicts a sub 400 positioned above a rotating tool 300, according to an embodiment. Elements depicted in FIG. 5 may be described above, and for the sake of brevity a further descriptions of these elements may be omitted.

After burst disc 414 ruptures and a first wiper 510 is pumped downhole, first wiper 510 may land on first sleeve 420. When first wiper 510 lands on first sleeve 420, an area below first wiper 510 may be isolated from an area above first sleeve. This may allow pressure above first wiper 510 to increase past a first pressure threshold associated with first shear pin 418. Responsive to the pressure above first wiper 510 increasing past the first pressure threshold, first shear pin 418 may shear and first sleeve 420 may slide towards a distal end of sub 400, close burst disc port 412, and expose communication port 416.

When communication port 416 is exposed, sub 400 may rotate by receiving rotational forces from a rotating tool coupled to the distal end of sub 400. While rotating, cement may be pumped through sub 400 and enter an annulus through communication port 416. Cement may then circulate or be displaced at 6 bbls/min into the annulus while rotating at 20-30 rpm to uniformly displace the cement into the annulus. This may ensure annular cement well barrier element integrity when creating a zonal isolation barrier.

Figure 6:
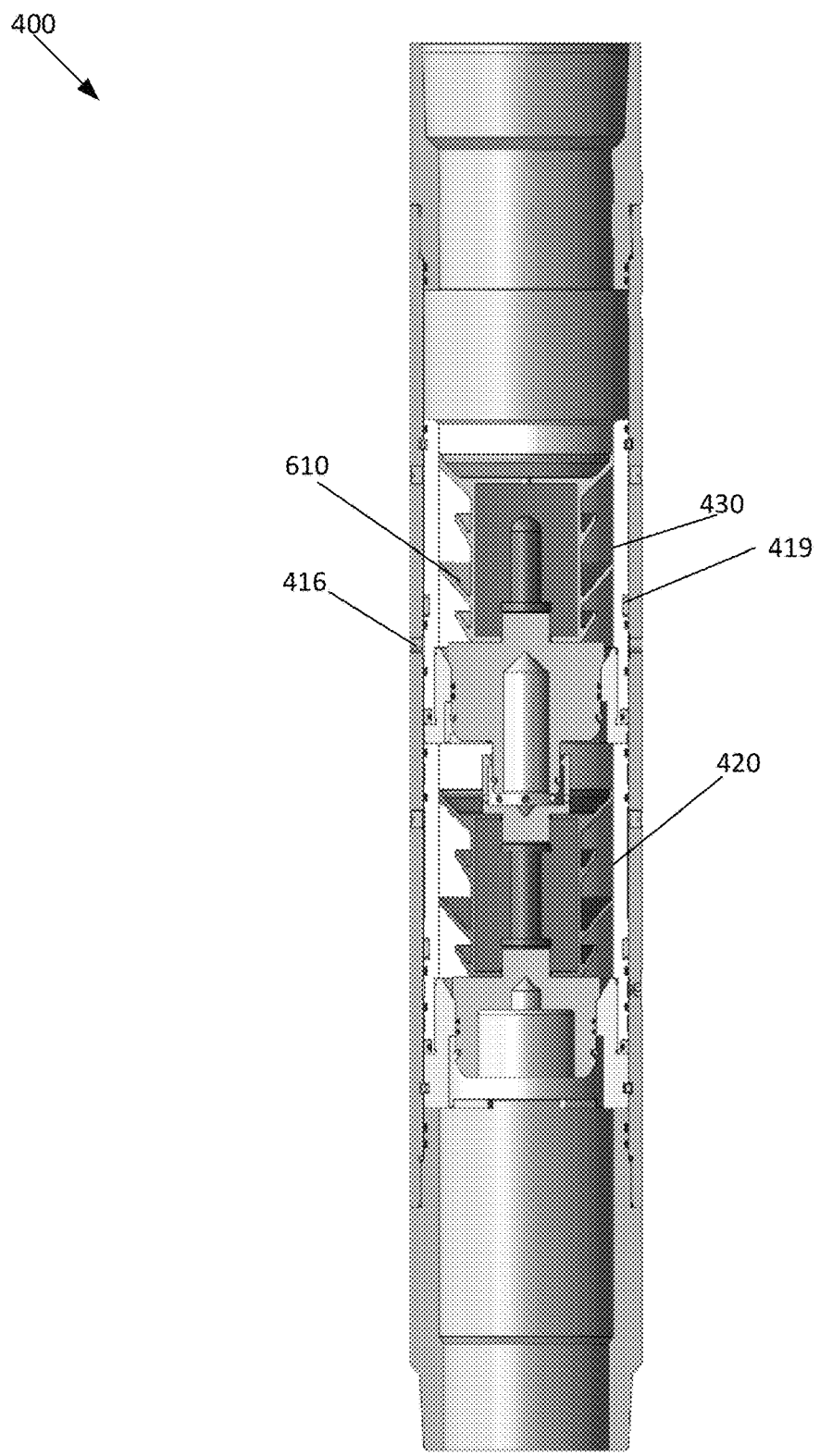
FIG. 6 depicts a sub positioned above a rotating tool, according to an embodiment.

FIG. 6 depicts a sub 400 positioned above a rotating tool 300, according to an embodiment. Elements depicted in FIG. 6 may be described above, and for the sake of brevity a further descriptions of these elements may be omitted.

After the cementing job is completed, second wiper plug 610 may be pumped downhole while sub 400 continues to rotate. This may further ensure annular cement well barrier element integrity. Second wiper plug 610 may be pumped downhole until second wiper plug 610 lands on second sleeve 430, isolating an area above second wiper plug 610 and an area below second wiper plug 430. This isolation may allow pressure above second wiper plug 610 to increase past a second pressure threshold to shear second shear pin 419.

Responsive to shearing second shear pin 419, second sleeve 430 may slide downhole to be positioned adjacent to a proximal end of first sleeve 420, and to cover communication port 416. Once the second sleeve 430 is locked in position, the rotating tool 300 may stop rotating, the casing string may hang off, and the upper part of the casing string above the rotating tool 300 may be pressure tested to verify integrity.

Figure 7:
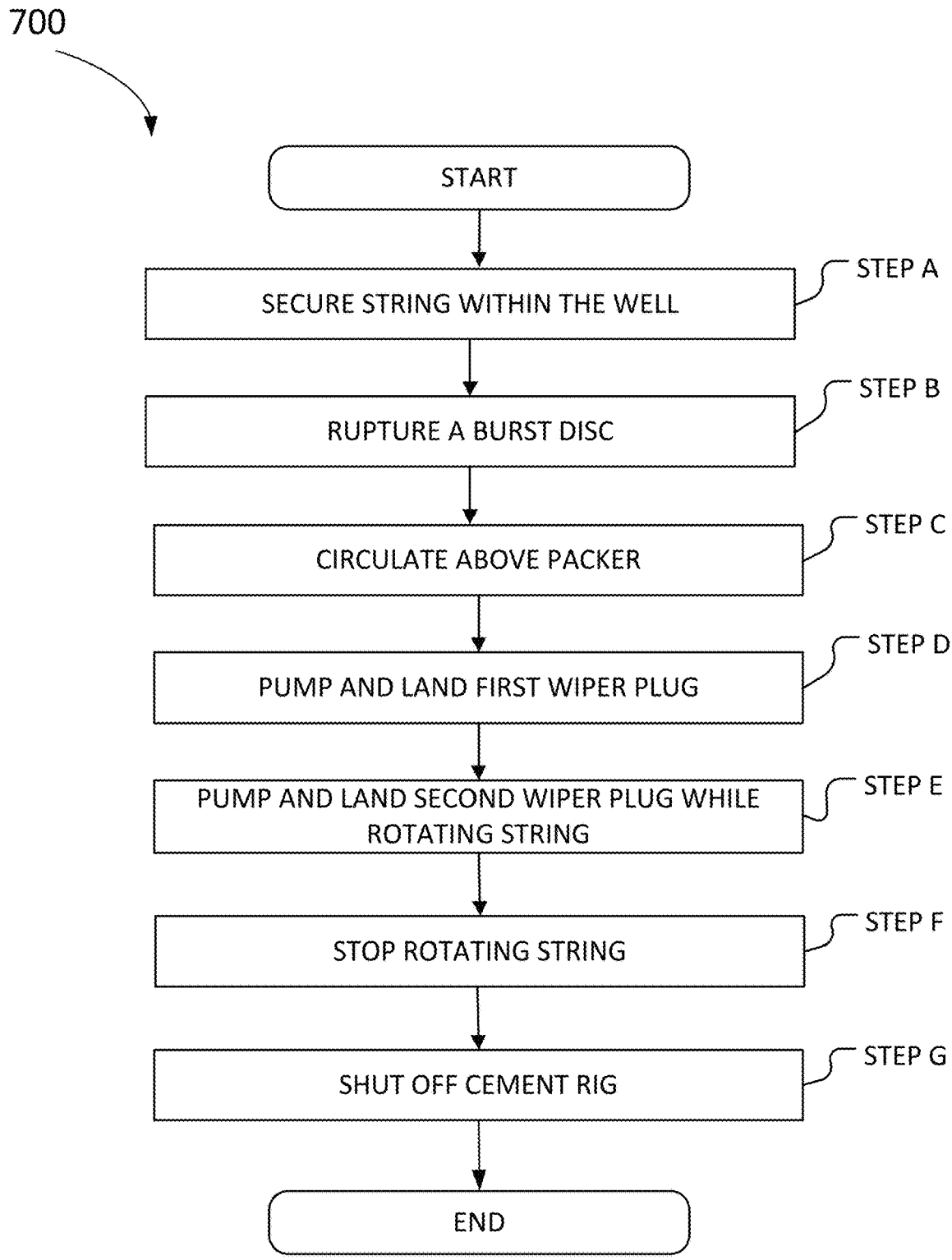
FIG. 7 depicts a method for ensure annular cement well barrier element integrity when creating a zonal isolation barrier, according to an embodiment.

FIG. 7 depicts a method 700 for ensure annular cement well barrier element integrity when creating a zonal isolation barrier, according to an embodiment. The operations of the method presented below are intended to be illustrative. In some embodiments, the method may be accomplished with one or more additional operations not described, and/or without one or more of the operations discussed. Additionally, the order in which the operations of the method are illustrated in FIG. 7 and described below is not intended to be limiting. Furthermore, the operations of method 700 may be repeated for subsequent zones in a well.

At step A, after a top plug has landed on the first stage cement job, a string may be hanged off in the wellhead, and the entire string may be pressurized to inflate a packer to secure the string within the well. Then, the pressure integrity of the string may be tested and the packer integrity may be tested as well.

At step B, pressure within the casing may increase to rupture a burst disc within the string above the packer.

At step C, circulation above the packer may be established through a passageway that housed the burst disc.

At step D, a spacer may be pumped through the sub, and a first wiper plug may be released. Cement slurry can be mixed and pumped, displacing the first plug down hole. The first wiper plug may be pumped downhole and land on a profile of a first sleeve, closing the passageway that housed the burst disc, sliding the first sleeve downward, sealing off burst disc, and exposing the communication ports. In embodiments, the spacer may be configured to exit the sub through the passageway, and cement will exit the sub through the communication port, wherein the sub rotates while circulating the cement.

At step E, after mixing and pumping of cement slurry is completed, a second wiper plug may be released while the sub is rotating. The second wiper plug may push the cement out of the rotating communication port while travelling towards the first wiper plug. Further, the second wiper plug may be configured to displace the cement with fluid while travelling downhole. The second wiper plug may land in a profile of the second sleeve, pressure above the second wiper plug may increase, and the second sleeve may travel downhole to close the communication port and locking second sleeve into position. These processes may occur while the sub is rotating.

At step F, the rotation of the sub may cease. The casing string may be hung off, and pressure integrity of the upper part of the casing above the packer may be verified.

At step G, the cement rig may be shut off at the surface.

Figure 8:
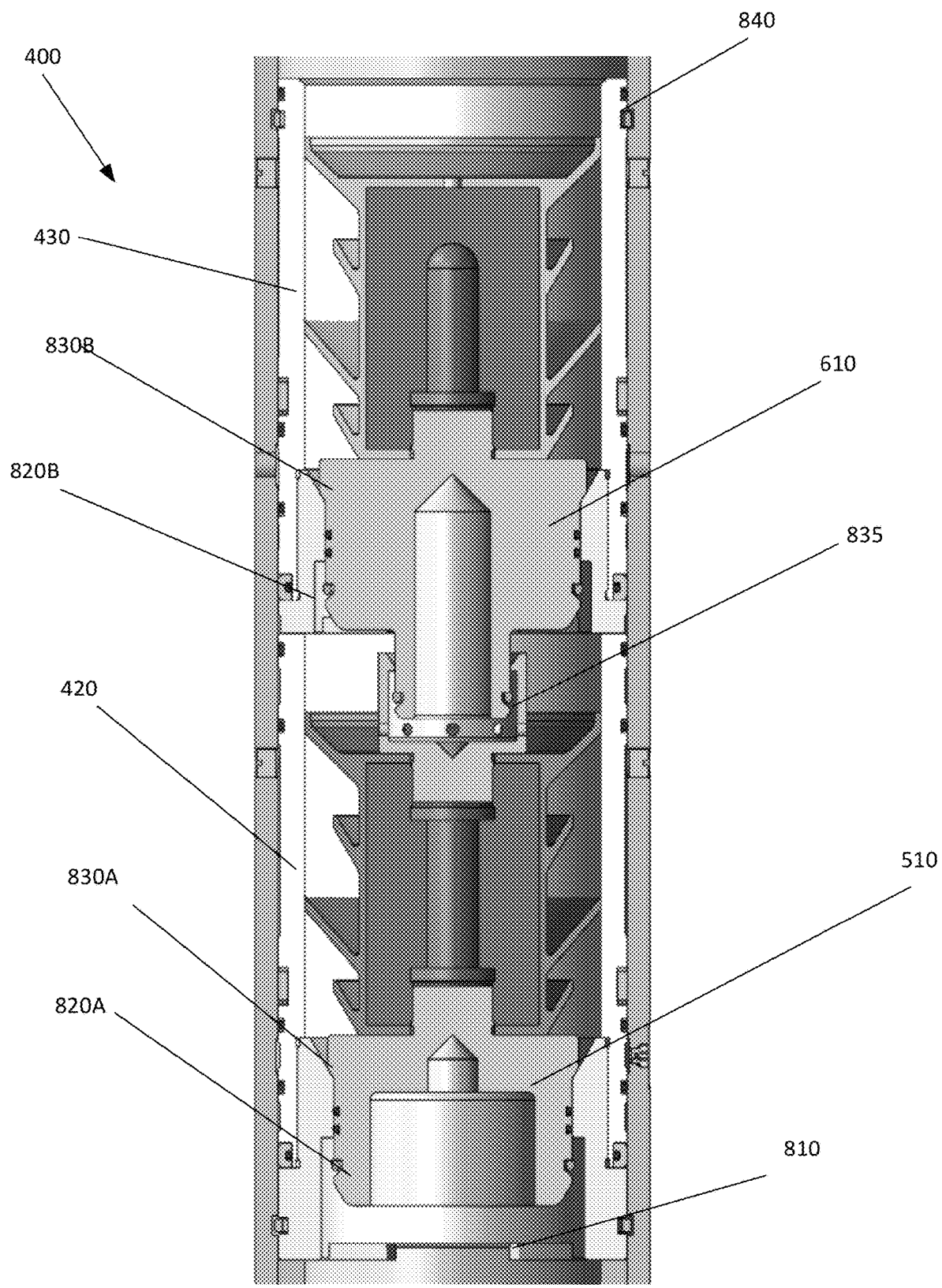
FIG. 8 depicts sub, according to an embodiment.

FIG. 8 depicts sub 400, according to an embodiment. Elements depicted in FIG. 8 may be described above and for the sake of brevity; a further description of these elements may be omitted.

As depicted in FIG. 8, sub 400 may include a plurality of anti-rotation elements that are configured to rotationally lock sub 400, first sleeve 420, first wiper plug 510, second sleeve 430, and second wiper plug 610 together. To rotationally lock the elements together, first sub 400 may include distal castling 810, first latching mechanism 820A, second latching mechanism 820B, first locking groove 830A, second locking groove 830B, plug couplers 835, and sub latch 840.

Distal castling 810 may be a series of alternating slots and fingers between a profile within sub 400 and a distal end of first sleeve 420. In embodiments, the slots of sub 400 are configured to be aligned with the fingers of first sleeve 420, and the slots of first sleeve 420 are configured to align with the fingers of sub 400. Distal castling 810 may be configured to allow the linear movement of first sleeve 420 in a first direction, but not allow the rotational movement of first sleeve 420 responsive to aligning the slots and fingers of distal castling 810.

First latching mechanism 820A may be configured to relatively rotationally and linearly lock first sleeve 420 with first wiper plug 510. First latching mechanism 820A may include an indentation positioned on a nose of first wiper plug 510 that is configured to receive a projection on an inner diameter of a distal end of first sleeve 420. Responsive to provisioning the projection within the indentation, all of the edges of the projection may be encompassed by the indentation.

Second latching mechanism 820B may be configured to relatively rotationally and linearly lock second sleeve 430 with second wiper plug 610. Second latching mechanism 820B may include an indentation positioned on a nose of second wiper plug 610 that is configured to receive a projection on an inner diameter of a distal end of second sleeve 430. Responsive to provisioning the projection within the indentation, all of the edges of the projection may be encompassed by the indentation.

Locking grooves 830A may be configured to relatively rotationally lock first sleeve 420 with first wiper plug 510. Locking grooves 830B may include an indentation positioned on a nose of first wiper plug 510 that is configured to receive a projection on an inner diameter of a proximal end of first sleeve 420.

Locking grooves 830B may be configured to relatively rotationally lock second sleeve 430 with second wiper plug 610. Locking grooves 830B may include an indentation positioned on a nose of second wiper plug 610 that is configured to receive a projection on an inner diameter of a proximal end of second sleeve 430.

Plug couplers 835 may be configured to lock and latch first wiper plug 510 and second wiper plug together 610. Plug couplers 835 may include an expandable ring on a nose of second wiper plug 610, and a latch on an inner diameter of the proximal end of first wiper plug 510. The expandable ring may be configured to expand into a groove within the latch to lock the two wiper plugs together.

Sub latch 840 may include an indentation on a proximal end of the outer diameter of second sleeve 430 that is configured to receive an expandable lock. Responsive to the indentation being aligned with the expandable lock, the expandable lock may have a second end extend into the indentation while the first end remains coupled to the inner diameter of sub 400. This may rotationally and linearly lock second sleeve 430 with sub 400.

Figure 9:
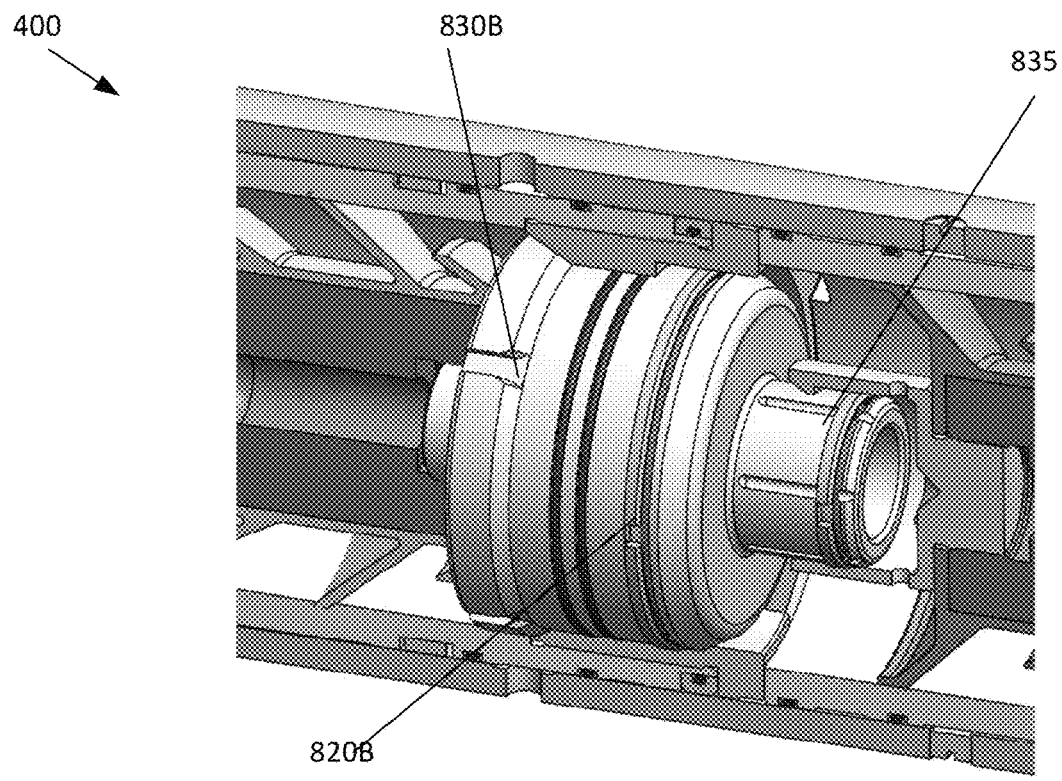
FIGS. 9 and 10 depict portions of a sub, according to an embodiment.
Figure 10:
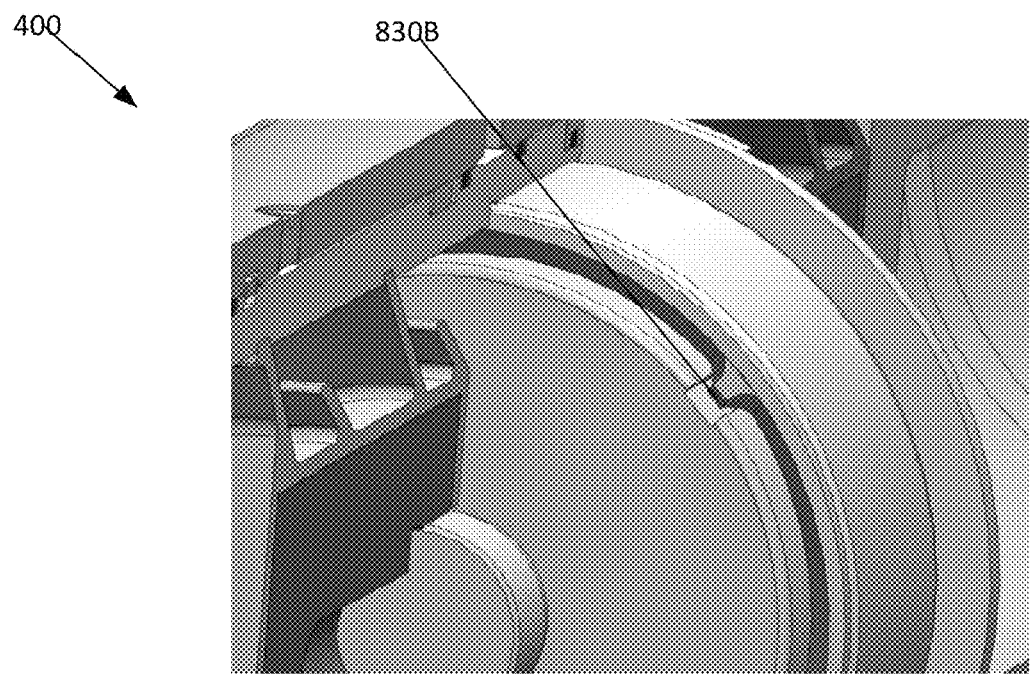

FIGS. 9 and 10 depict portions of sub 400, according to an embodiment. Elements depicted in FIGS. 9 and 10 may be described above, and for the sake of brevity a further description of these elements may be omitted.

Figure 11:
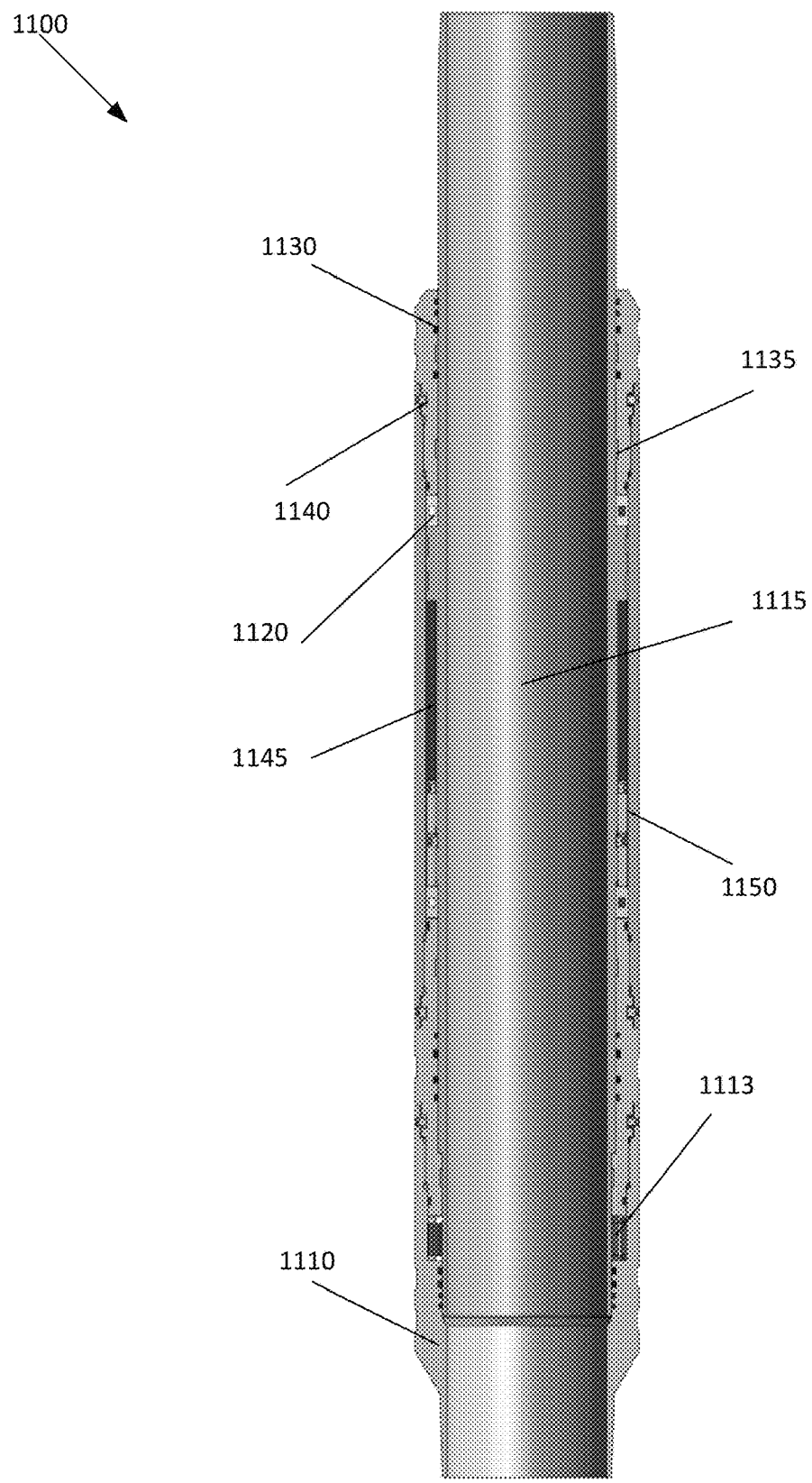
FIG. 11 depicts a rotating tool, according to an embodiment.

FIG. 11 depicts a rotating tool 1100, according to an embodiment. Elements depicted in FIG. 11 may be described above, and for the sake of brevity a further description of these elements may be omitted.

Rotating tool 1100 may include an outer housing 1110, inner housing 1115, rotating element 1120, clutch 1113, seals 1130, rings 1135, set screws 1140, swellable element 1145, and threaded element nut and mandrel 1150.

Outer housing 1110 and inner housing 1115 may be tubular elements that are configured to selectively and relatively rotate. Outer housing 1110 and inner housing 1115 may be separated by rotating element 1120 and clutch 1113. Responsive to rotating inner housing 1115 in a first direction, clutch 1113 may not transfer rotational forces to outer housing 1110. Responsive to rotating inner housing 1115 in a second direction, clutch 1113 and rotating element 1112 may allow outer housing 1110 to rotate in the second direction. This rotating of outer housing 1110 may correspondingly rotate a string coupled to outer housing 1110, wherein the rotation of the string coupled to outer housing 1110 may be in a position within the wellbore close to a cementing job.

Bearings 1120 may be positioned between outer housing 1110 and inner housing 1115, and may be high tensile rated axial bearings set up in tandem to evenly distribute a rotational load.

Seals 1130 may be positioned between outer housing 1110 and inner housing 1115 to prevent unwanted fluid, gas, pressure mitigation, etc. during run-in or during operation.

Rings 1135 may be wear rings that are positioned between outer housing 1110 and inner housing 1115 and are configured to aid rotating tool 1100 during operation to maintain all components properly aligned and reduce rotational friction. This may allow for prolonged use of rotating tool 1100 during the cementing process.

Set screws 1140 may be configured to couple inner housing 1115 and outer housing 1110, and be configured to prevent threaded connections from backing off during cementing.

Swellable element 1145 may be positioned between outer housing 1110 and inner housing 1115, and may be an expandable element that is configured to expand after a cementing operation. The swellable elements may prevent any long term pressure migration into the inner housing's 1115 inner diameter.

Threaded element nut and mandrel 1150 may be configured to act as a backup jam nut or stop to prevent the mandrel nut from shifting into the sweallable element during operation. The mandrel nut may be configured to allow proper pre-loading on bearings 1120, and to assist with distributing the load evenly between both of the bearings 1120 while keeping the mandrel concentric.

Figure 12:
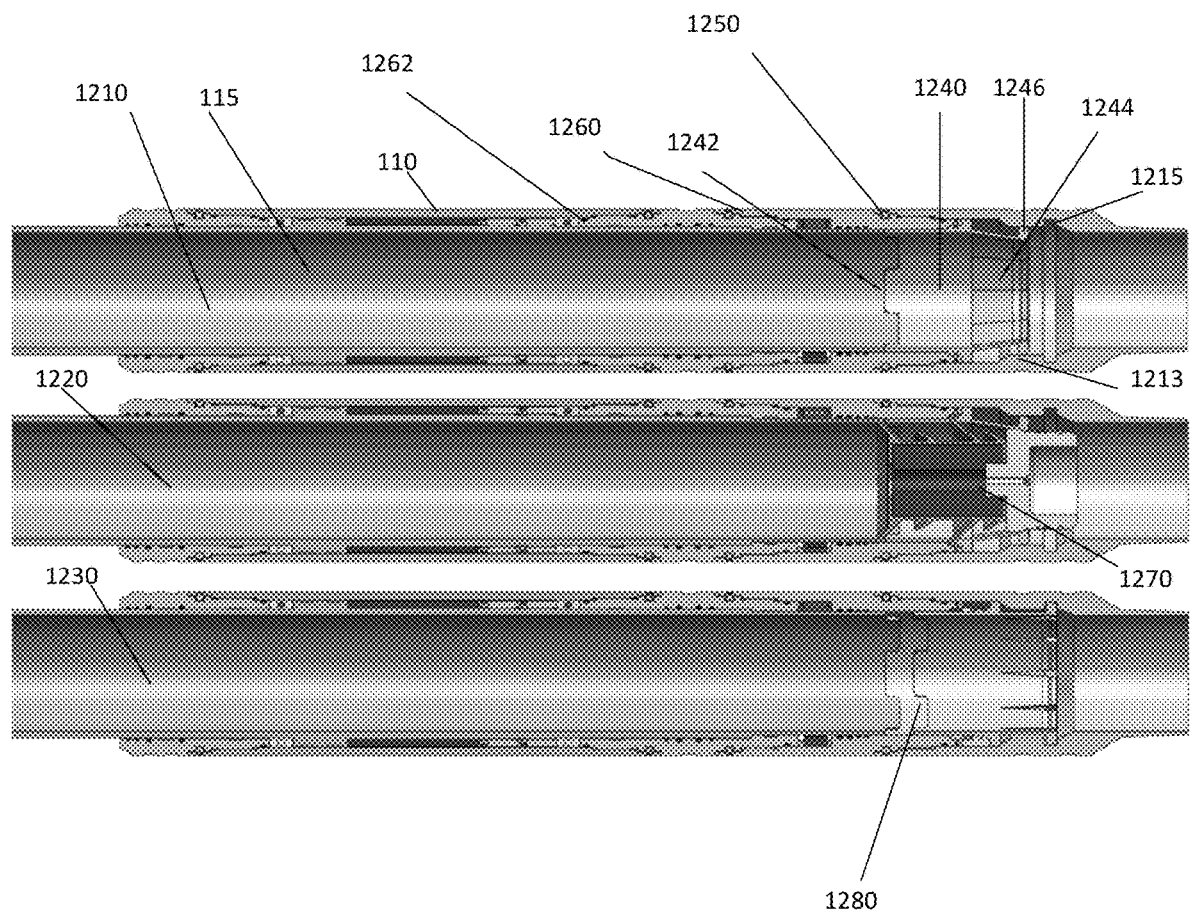
FIG. 12 depicts a rotating tool with an anti-rotation collet coupled to a distal end of an inner housing, according to an embodiment.

FIG. 12 depicts a rotating tool with an anti-rotation collet 1240 coupled to a distal end of an inner housing 115, according to an embodiment. Furthermore, FIG. 12 depicts three stages 1210, 1220, 1230 associated with operating the anti-rotation collet 1240. Elements depicted in FIG. 12 may be described above, and for the sake of brevity a further description of these elements may be omitted.

Anti-rotation collet 1240 may be positioned on a distal end of inner housing 115, and be encompassed by outer housing 110. When run in hole, anti-rotation collet 1240 may be coupled to outer housing 110 via shear screws 1250 that are configured to break responsive to a pressure being applied to shear screws 1250 being above a pressure threshold. When shear screws 1250 are intact anti-rotation collet 1240 may not slide or move relative to outer housing 110 and/or inner housing 115. Furthermore, when anti-rotation collet 1240 is coupled to outer housing 110, inner housing 115 nor outer housing 110 may rotate relative to one another. Responsive to shear screws 1250 breaking, anti-rotation collet 1240, anti-rotation collet 1240 may slide towards the distal end of outer housing 110 creating space between the proximal end of anti-rotation collet 1240 and the distal end of inner housing 115. This may enable the free rotation of inner housing 110 relative to outer housing 110.

Anti-rotation collet 1240 may include castling 1242, fingers 1244, and projection 1246.

Castling 1242 may be a series of abutments and indentations that are configured to be interfaces with reciprocal indentations and abutments on the distal end of inner housing 115. When castling 1242 is interfaced with inner housing 115, the mandrel can handle high torque forces during tool run-in. However, after castling is disengaged from inner housing 115 after anti-rotation collet 1240 has shifting open, inner housing 115 may freely rotate.

Fingers 1244 may be positioned on a distal end of anti-rotation collet 1240. Fingers 1244 may be configured to radially expand, such that an outer diameter of fingers 1244 may be substantially the same as an inner diameter of a portion of the profile of outer housing 110 that is aligned with the outer diameter of fingers 1244. Accordingly, if bump 1213 on inner diameter of outer housing 110 has a first inner diameter, and a groove 1215 on the inner diameter of outer 110 has a second inner diameter, when fingers 1244 are aligned with bump 1213 fingers 1244 may have a first inner diameter and when aligned with the groove 1213 fingers 1244 may have a second inner diameter. This may allow fingers 1244 to restrict the inner diameter across outer housing 110 before activation, while matching the full bore inner diameter when activated.

Projection 1246 may be positioned on an outer diameter of fingers 1244, and be configured to be positioned adjacent to the inner diameter of outer housing 110. When run in hole, projection 1246 may be positioned adjacent to bump 1270. Responsive to breaking shear screws 1250, projection 1246 may slide downhole to be positioned within groove 1215. This may cause anti-rotation collet 1240 to be latched into outer housing 110, limiting the relative linear movement of anti-rotation collet 1240 with outer housing and opening the collet fingers.

Furthermore, outer housing 110 may include different shoulder profiles 1260, 1262, which may prevent any premature collet shifting during run-in prior to shear screws 1250 breaking.

At operation 1220, once the rotating tool is positioned at a desired depth, a wiper plug 1270 may be pumped downhole. Wiper plug 1270 may land on anti-rotation collet 1240, and shear the shear screws 1250.

At operation 1230, after the shear screws 1250 are sheared, anti-rotation collet 1240 may be activated, increasing the inner diameter across fingers 1240 allowing wiper plug 1270 to move downhole. Furthermore, after anti-rotation collet 1240 moves downhole projection 1260 may be latched into grooves 1215. This may create a space 1280 between collet 1280 and inner housing 115, allowing inner housing 115 to freely and independent rotate.

Figure 13:
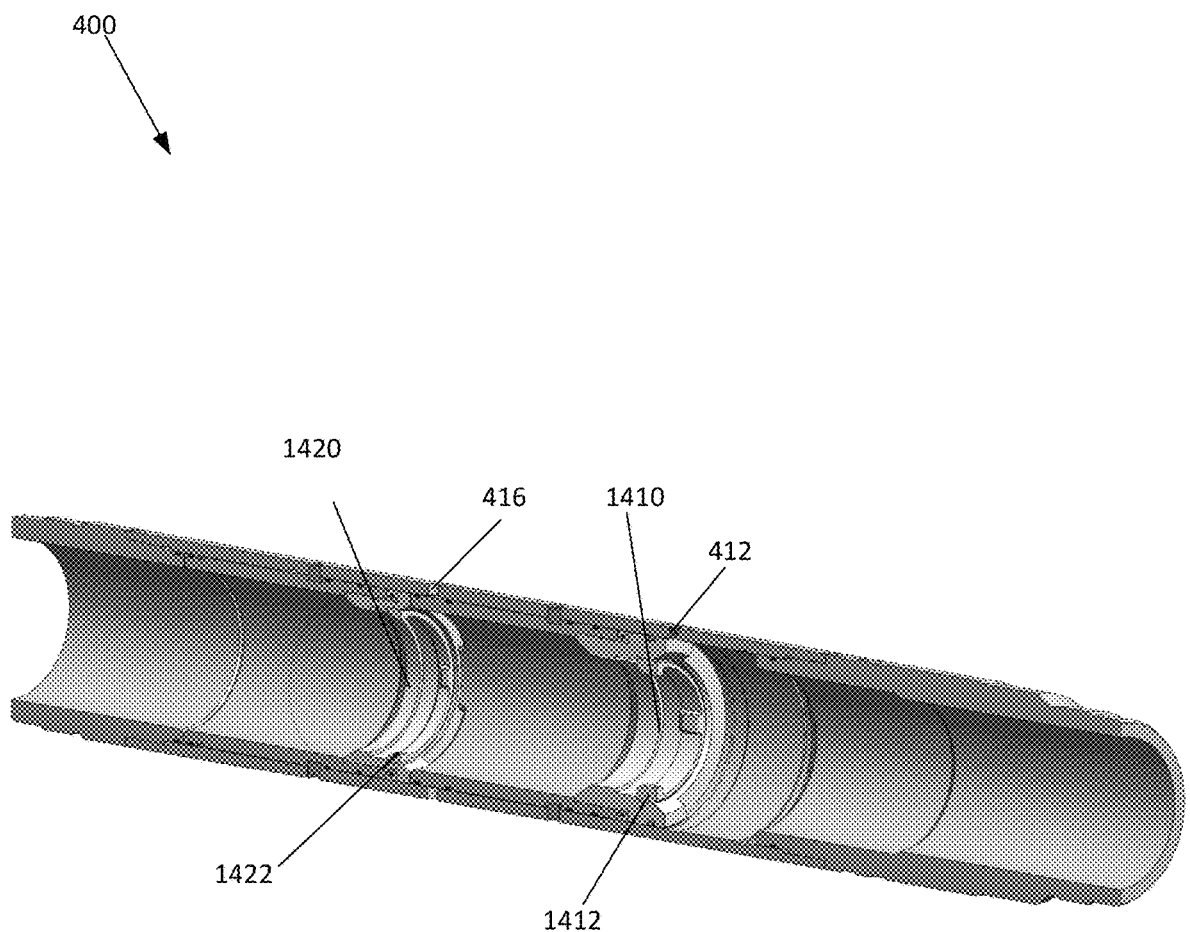
FIG. 13 depicts a sub, according to an embodiment.

FIG. 13 depicts sub 400, according to an embodiment. Elements depicted in FIG. 13 may be described above, and for the sake of brevity a further description of these elements may be omitted.

As depicted in FIG. 13 sub 400 may include a first insert 1410 configured to receive a first wiper plug, and a second insert 1420 configured to receive a second wiper plug. First insert 1410 may include first anti-rotation projections 1412, and second insert 1420 may include second anti-rotation projections 122. The anti-rotation projections 1412, 1422 are configured to be interfaced with grooves on a nose of corresponding wiper plug, which may assist in limiting the relative rotations of the wiper plugs and inner housing if milling is required.

Furthermore, first insert 1410 and second insert 1410 may include tapered profiles, which may correspond with the tapering of the outer diameter of the wiper plugs. Once a corresponding wiper plug lands on a corresponding insert, the tapered profile may create a friction lock fit, and a metal to metal sealing surface. This friction fit may prevent the plug nose to back out linearly, and prevent rotation during a milling operation.

FIGS. 14-16 depicts a rotation tool 200 coupled to a sub 400 via a casing string 1410, according to an embodiment. Elements depicted in FIGS. 14-16 may be described above, and for the sake of brevity a further description of these elements may be omitted.

As depicted in FIGS. 14-16 a casing string 1410 may couple rotating tool 200 and sub 400. Responsive to turning rotating tool 200 in a second direction, outer housing 110 may turn casing string 1410, which may in turn rotate sub 400.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

For example, in embodiments, the length of the dart may be longer than the length of the tool.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A downhole tool for forming an annular barrier comprising:
   a housing with a communication port and a disc port, wherein a rupture disc is configured to be positioned within the disc port;
   a first sleeve configured to move within the housing, wherein in a first position the first sleeve is configured to cover the communication port and in a second position the first sleeve is configured to cover the disc port and expose the communication port;
   a second sleeve configured to move within the housing, wherein the second sleeve is configured to move downhole to be positioned adjacent to the first sleeve, wherein when the second sleeve is positioned adjacent to the first sleeve the second sleeve covers the communication port;
   a first wiper plug that is configured to move the first sleeve from the first position to the second position; and
   a second wiper plug that is configured to move the second sleeve within the housing.

2. The downhole tool of claim 1, wherein the rupture disc is configured to break before the first sleeve moves from the first position to the second position.

3. The downhole tool of claim 2, further comprising:
   a rotating tool configured to rotate the housing when the first sleeve is in the second position.

4. The downhole tool of claim 3, wherein a distal end of the housing is coupled to a proximal end of the rotating tool.

5. The downhole tool of claim 3, wherein a cementing operation is configured to be performed through the communication port while the rotating tool is rotating the housing in a first direction.

6. The downhole tool of claim 3, wherein the first sleeve includes first anti-rotation projections, the first anti-rotation projections being configured to limit a relative rotation of the first sleeve and the first wiper plug.

7. The downhole tool of claim 6, wherein the first anti-rotation projections are configured to interface with grooves on a nose of the first wiper plug.

8. The downhole tool of claim 1, wherein the first sleeve is coupled to the housing via a first shear pin, and the second sleeve is coupled to the housing via a second shear pin.

9. The downhole tool of claim 1, further comprising:
   a packer configured to radially expand to seal an annulus between a wellbore wall and an outer diameter of the housing before the first sleeve moves from the first position to the second position, the packer being positioned downhole from the disc port.

10. A method for forming an annular barrier downhole comprising:
    moving a first sleeve within a housing from a first position to a second position, wherein in the first position the first sleeve covers a communication port through the housing, and in the second position the first sleeve covers a disc port extending through the housing and exposes the communication port;
    moving a second sleeve within the housing to be positioned adjacent to the first sleeve, wherein when the second sleeve is positioned adjacent to the first sleeve the second sleeve covers the communication port;
    landing a first wiper plug within the first sleeve to move the first sleeve from the first position to the second position; and
    landing a second wiper plug on the second sleeve to move the second sleeve within the housing.

11. The method of claim 10, further comprising:
    breaking the rupture disc before the first sleeve moves from the first position to the second position.

12. The method of claim 11, further comprising:
    rotating, via a rotating tool, the housing when the first sleeve is in the second position.

13. The method of claim 12, wherein a distal end of the housing is coupled to a proximal end of the rotating tool.

14. The method of claim 12, further comprising:
    performing a cementing operation through the communication port while the rotating tool is rotating the housing in a first direction.

15. The method of claim 12, wherein the first sleeve includes first anti-rotation projections, the first anti-rotation projections being configured to limit a relative rotation of the first sleeve and the first wiper plug.

16. The method of claim 15, wherein the first anti-rotation projections are configured to interface with grooves on a nose of the first wiper plug.

17. The method of claim 10, wherein the first sleeve is coupled to the housing via a first shear pin, and the second sleeve is coupled to the housing via a second shear pin.

18. The method of claim 10, further comprising:
    radially expanding a packer to seal an annulus between a wellbore wall and an outer diameter of the housing before the first sleeve moves from the first position to the second position, the packer being positioned downhole from the disc port.

* * * * *